Oct. 16, 1951     B. W. BOGDAN     2,571,820
REFRIGERANT COMPRESSOR
Filed March 31, 1948
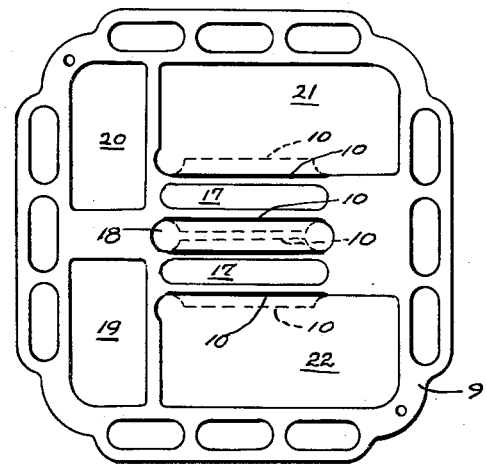
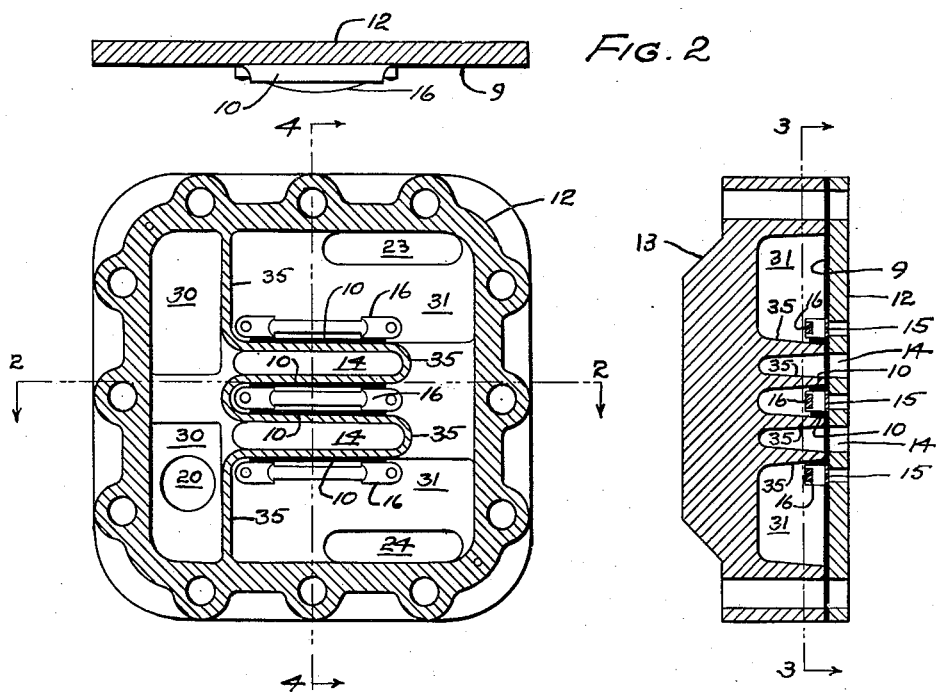
INVENTOR.
Benjamin W. Bogdan
BY Robert J. Palmer
Attorney Patented Oct. 16, 1951

2,571,820

UNITED STATES PATENT OFFICE 2,571,820

REFRIGERANT COMPRESSOR

Benjamin W. Bogdan, Dedham, Mass., assignor to Westinghouse Electric Corporation, East Pittsburgh, Pa., a corporation of Pennsylvania Application March 31, 1948, Serial No. 18,190

1 Claim. (Cl. 230—202)

This invention relates to refrigerant compressors, and has as an object the elimination of failure, due to slugging by refrigerant liquid, of the gasket between the valve plates and the cylinder heads of such compressors.

Certain refrigerant compressors of the reciprocating piston type have between the ends of cylinders and the cylinder heads, valve plates containing suction and discharge reeds, gaskets being placed between the valve plates and the cylinder heads, the heads having ribs which separate the suction and discharge passages. The portions of the gaskets between the passages aligned with the suction and discharge reeds have been flat and have been contacted by the inner ends of the ribs.

Liquid refrigerant occasionally is drawn into the compressors; and, in the past, the slugging action of such liquid has been sufficient to force the portions of the gaskets extending between the passages aligned with the suction and discharge reeds, into the suction passages, thus causing failures of the gaskets.

This invention prevents such gasket failures by providing the gasket portions between the passages aligned with the suction and discharge reeds, with portions extending substantially perpendicular to the gasket, and which lie against the ribs on the cylinder heads. Any slugging by the liquid refrigerant forces the extensions of the gasket against the ribs, the additional strength of the gasket provided by this construction being sufficient to prevent the gasket from failing.

The invention will now be described with reference to the drawing of which:

Fig. 1 is a plan view of an aluminum gasket embodying this invention, the dashed lines illustrating the positions of the gasket extensions which lie against the ribs of the cylinder head before they have been turned perpendicular to the gasket;

Fig. 2 is an end view, in section, of the upper valve plate of the refrigerant compressor, with the gasket as used in service placed thereagainst, the section being taken along the lines 2—2 of Fig. 3, but with the cylinder head of Fig. 3 not shown;

Fig. 3 is a plan view of the compressor head, in section, placed upon the gasket and the upper valve plate, the section being taken along the lines 3—3 of Fig. 4; and Fig. 4 is a side elevation, in section, of the compressor head, the gasket, and the upper valve plate, the section being taken along the lines 4—4 of Fig. 3.

The gasket 9 illustrated by Fig. 1 is a conventional one except that it has the extensions 10 which are adapted to be turned substantially perpendicular to the gasket when placed in service. The dashed lines indicate the position of the gasket extensions before they are bent.

The gasket 9 is adapted to be placed upon the upper valve plate 12 of a refrigerant compressor, and the cylinder head 13 is adapted to be placed upon the gasket, the valve plate and the cylinder head being bolted to the compressor cylinder, as is usual.

The valve plate 12 has the conventional discharge reeds 15 which have the conventional valve stops 16. The suction, valve passages 14 are aligned with conventional suction reeds which are not illustrated.

The gasket has the openings 17 in alignment with the suction, valve passages 14; has the central opening 18 in alignment with the central discharge reed 15; has the openings 19 and 20 in alignment with the suction passage 30 in the cylinder head and into which the suction port 20 opens; and has the openings 21 and 22 in alignment with the discharge passage 31 in the cylinder head and into which the discharge ports 23 and 24 open.

The cylinder head 13 has the inwardly extending ribs 35, the inner ends of which contact the gasket, around the described openings and which separate the suction passages from the discharge passages.

As illustrated by Figs. 3 and 4, the perpendicular extensions 10 of the gasket 9 lie against those portions of the ribs 35 which separate the suction, valve passages aligned with the suction reeds and the discharge reeds.

In operation, on the suction strokes of the compressor, the suction reeds open and refrigerant gas is drawn into the cylinder. The discharge reeds are closed. On the compression strokes, the compressed refrigerant gas enters the discharge passages 31 through the discharge reeds, its pressure causing the suction reeds to close.

During the compression strokes, if there is any liquid in the compressed refrigerant gas, it will tend to blow through the gasket portions between the discharge valve passages and the suction valve passages, but the turned-up gasket extensions form extended surfaces in its path, and are backed up by the ribs of the cylinder head, with the result that the gaskets will not tear and will withstand the severest slugging it is possible to produce.

For clearness of illustration, the gasket is shown by Figs. 2, 3, and 4 by thickened black lines, the thickness being exaggerated. The gaskets preferably are of aluminum.

While one embodiment of the invention has been described for the purpose of illustration, it should be understood that the invention is not limited to the exact apparatus and the arrangement of apparatus illustrated, as modifications thereof may be suggested by those skilled in the art without departure from the essence of the invention.

What is claimed is:

In a compressor having a valve plate with a straight suction slot therethrough and a straight discharge slot therethrough on each side of said suction slot and spaced therefrom and extending substantially parallel thereto, and having a cylinder head with a substantially straight rib extending between each of said discharge slots and said suction slot, the combination of a gasket between said head and plate, said gasket having slots in alignment with said suction and discharge slots, and having bent-up portions extending from the sides of said suction slot in said gasket alongside and in contact with said ribs.

BENJAMIN W. BOGDAN.

REFERENCES CITED

The following references are of record in the file of this patent:

UNITED STATES PATENTS

| Number | Name | Date |
| --- | --- | --- |
| 1,310,944 | Davol | July 22, 1919 |
| 1,738,513 | Bailey | Decc. 10, 1929 |
| 2,000,735 | Arnold | May 7, 1935 |
| 2,109,814 | Balfe | Mar. 1, 1938 |

FOREIGN PATENTS

| Number | Country | Date |
| --- | --- | --- |
| 188,391 | Switzerland | Mar. 16, 1937 |
| 587,568 | France | Apr. 21, 1925 |